United States Patent [19]
Kiefer et al.

[11] 3,989,437
[45] Nov. 2, 1976

[54] MOULDING APPARATUS

[75] Inventors: Erich Kiefer, Bonn-Holzlar; Heinz Rolniczak, Hennef; Peter Bohlscheid, St. Augustin, all of Germany

[73] Assignee: Kautex-Werke Reinold Hagen GmbH, Bonn-Holzlar, Germany

[22] Filed: Oct. 11, 1974

[21] Appl. No.: 514,208

[30] Foreign Application Priority Data
May 15, 1974  Germany............................ 2423503

[52] U.S. Cl. .................... 425/326 B; 425/450.1; 425/DIG. 205
[51] Int. Cl.[2] ......................................... B29C 5/06
[58] Field of Search .... 425/326 B, 450.1, DIG. 205, 425/326 R; 100/264

[56] References Cited
UNITED STATES PATENTS

| | | | |
|---|---|---|---|
| 2,785,439 | 3/1957 | Gostrow | 100/264 X |
| 3,040,380 | 6/1962 | Alosky | 425/326 B X |
| 3,069,722 | 12/1962 | Kato | 425/326 B |
| 3,115,673 | 12/1963 | Rudolph | 425/326 B X |
| 3,274,819 | 9/1966 | Knowles | 100/264 X |
| 3,408,692 | 11/1968 | Schaich | 425/326 B |
| 3,559,235 | 2/1971 | Hogen | 425/326 B X |
| 3,576,048 | 4/1971 | Stanley | 425/326 B |
| 3,642,410 | 2/1972 | Bourgeois | 425/326 B |
| 3,738,788 | 6/1973 | Langecker | 425/326 B |
| 3,781,395 | 12/1973 | Uhlig | 425/326 B X |

*Primary Examiner*—Ronald J. Shore
*Attorney, Agent, or Firm*—Laurence R. Brown

[57] ABSTRACT

Apparatus for the production of hollow articles of thermoplastics material by a blowing process, comprising a hollow mould in which a preform blank is arranged to be expanded by the application of blowing pressure, the mould being formed in at least two parts with the mould parts being movable relative to one another, means supporting said mould parts, means for effective relative movement of the mould parts, and means for taking up the forces resulting from the blowing pressure, comprising a closed frame on which the mould parts are arranged and which comprises upper and lower tie members with side pieces extending therebetween to connect the tie members, the upper and lower tie members being arranged to lie in respective vertical planes which are spaced from one another, and the side pieces being orientated at an acute angle relative to the horizontal.

11 Claims, 6 Drawing Figures

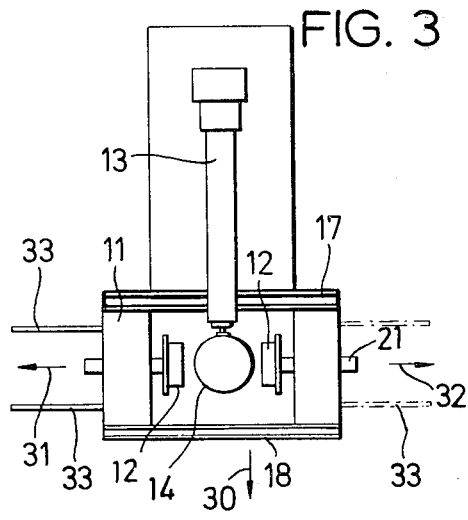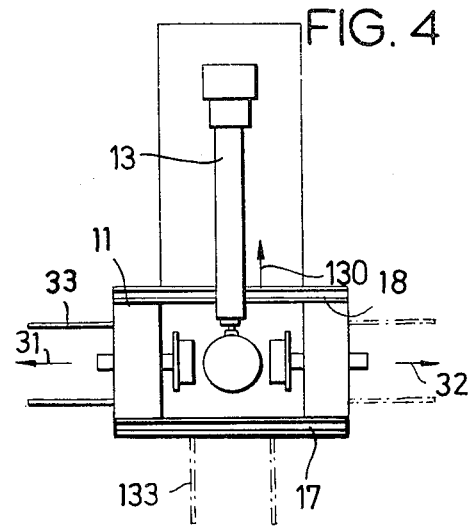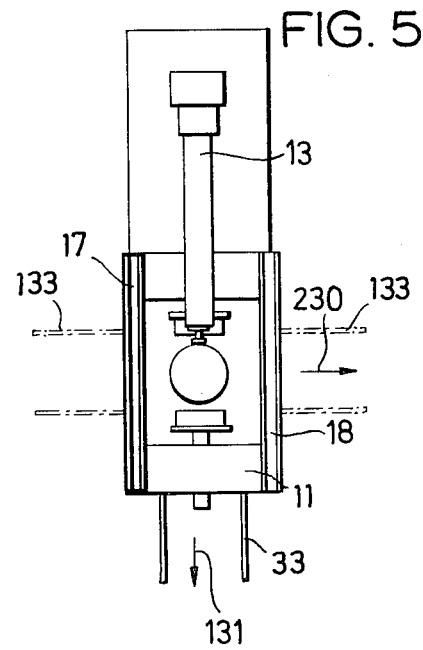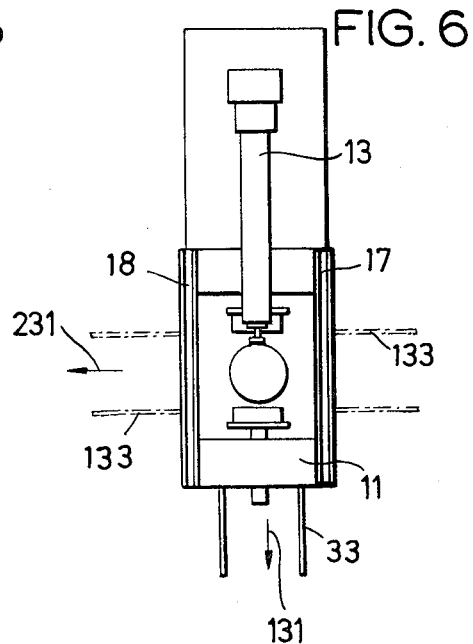

3,989,437

MOULDING APPARATUS

FIELD OF THE INVENTION

This invention relates to apparatus for producing hollow moulded articles of thermoplastics material by a blowing process.

The invention concerns apparatus which comprises a hollow mould having at least two parts which are movable relative to one another, means for supplying a pressurized medium to the closed mould and into a preform blank located therein for the expansion of the blank to form the article, and means for supporting and for effecting the relative movement of the mould parts as well as for taking up the forces resulting from the blowing pressure, the mould parts being arranged on a closed frame which comprises upper and lower tie members with side pieces extending therebetween to connect the tie members.

DESCRIPTION OF THE PRIOR ART

In one known form of apparatus of the type mentioned above and as described in German Offenlegungschrift No. 1604591 the closed frame is orientated in a vertical plane. In other words, in this prior arrangement the upper tie member is positioned vertically above the lower tie member. Consequently, the side pieces also extend vertically.

This known apparatus is used for the production of moulded hollow articles which are of large volume, for example of up to 3,000 liters. Thus, very high clamping and sealing forces are necessary which must be at least equal to the forces which result from the blowing pressure and which act on the mould parts. A closed frame is particularly well suited for taking up such forces. The manufacture of large hollow articles naturally presupposes the use of correspondingly large and thus heavy mould parts. This applies also to all the other related and associated components, for example the supply means for the blowing air, and injection devices for the usually tubular preform blank, whose dimensions and weight depend entirely upon the size of the article to be produced. For these reasons it is desirable that any region of the apparatus in which there are components which need to be replaced or exchanged in dependence upon the type or size of the article to be produced, such as for example the mould parts, should be easily accessible, in particular with the object of being able to bring any necessary auxiliary means into this region or regions without difficulty. The sort of auxiliary means which may be concerned here is for example a crane, a hoist, or the like. This is not possible in the known apparatus referred to above since the region in question is blocked off at the top by one of the upper tie members.

It is also true that apparatus is known for the production of hollow articles of thermoplastics material by a blowing process comprising two-part or multi-part moulds where the mould parts are movable relative to one another, where a supply for feeding a pressurized medium into the closed mould and into a preform blank located therein is provided for the expansion of the blank, and where means are provided for supporting and for effecting relative movement of the mould parts as well for receiving the forces resulting from the blowing pressure, in which the guidance of the mould parts is effected by two transversely extending cross-beams, one of which is arranged at the top and the other of which is arranged at the bottom. Both cross-beams are arranged offset forwardly and rearwardly respectively relative to the plane of symmetry of the apparatus extending parallel to the cross-beams, so that the two cross-beams lie in a plane which extends diagonally relative to the central vertical plane of symmetry through the mould parts. This arrangement is known from German patent specification No. 1802915, but however is only suitable for apparatus for producing smaller hollow articles, for example in a size range of 1 to 10 liters. Moreover, the diagonal arrangement of cross-beams is for the purpose of making possible the movement of the mould between two stations. Furthermore, this known arrangement is not concerned with a closed frame made up from tie members and side pieces. On the contrary, the cross-beams serve as support elements and as guide means for plates which carry the mould parts. Because of this, in each case, the working zone is limited.

SUMMARY OF THE INVENTION

It is therefore an object of the present invention to provide apparatus of the general type first mentioned above so modified that, while still retaining the advantages of the closed frame, the region in which the removable components, particularly the mould parts, are located is made easily accessible. The same should preferably also apply to the region beneath the hollow mould in which various additional devices, such as devices for the supply of compressed air and the like, are frequently arranged. Moreover, the simple operability of the machine and the possibility of removing the finished articles without hindrance should also be ensured.

In accordance with the present invention there is provided apparatus for the production of hollow articles of thermoplastics material by a blowing process, comprising a hollow mould in which a preform blank is arranged to be expanded by the application of blowing pressure, the mould being formed in at least two parts with the mould parts being movable relative to one another, means supporting said mould parts, means for effecting relative movement of the mould parts, and means for taking up the forces resulting from the blowing pressure comprising a closed frame on which the mould parts are arranged and which comprises upper and lower tie members with side pieces extending therebetween to connect the tie members, the upper and lower tie members being arranged to lie in respective vertical planes which are spaced from one another, and the side pieces being orientated at an acute angle relative to the horizontal.

Preferably, the side pieces make an angle of between 30° and 60°, preferably about 45°, with the horizontal. The choice of the particular angle is dependent upon the particular circumstances, although it is of significance that with the larger value angles the distance between the two vertical planes is less, and the distance between the two horizontal planes in which the tie members are positioned is greater. The optimum size of angle may be determined for any particular application and circumstances.

It is essential that the most important function of the frame, namely the taking up of the sealing forces and of the forces resulting from the blowing pressure, should in no way be limited or impaired. On the other hand, the upper tie member takes up a position which is displaced forwardly or rearwardly relative to the vertical plane in which for example the movement of the mould parts takes place, so that the region in which the mould parts are located is accessible from above without difficulty. The same applies to the lower tie member which is likewise offset forwardly or rearwardly of the above-mentioned vertical plane, and in opposition to the direction in which the upper tie member is offset relative to said vertical plane. This has the result that the region beneath the mould parts is not reduced in size by the lower tie member of the closed frame. On the contrary, practically the whole region beneath the mould parts down as far as the base and possibly even down into the latter, is available for any necessary components and for example also for the movement of means for receiving the moulded articles, without it being necessary to weaken the frame construction, particularly the lower tie member, taking up the forces resulting from the blowing pressure. Reference here to components, as earlier, should be understood as including for example the means for supplying the compressed medium, and other auxiliary devices for handling the preform blank or for carrying out the moulding operation. It is important that there should also be accessibility from the sides.

As compared with the apparatus referred to above disclosed in German patent specification No. 1802915, the present invention makes use of a frame which in essence takes up only those forces resulting from the blowing pressure, although it is of course possible that each of the tie members, and/or possibly the side pieces, may each consist of two or more parallel bars or the like. It will further be clear that the shape and form of the bars or the like can be adapted both in relation to their type and size according to the particular loading. Thus it is advantageous to choose the shape of the side pieces which are subjected to bending stresses in dependence upon the moments acting on any particular cross-section thereof.

According to a preferred embodiment of the invention, the closed frame for the mould parts is mounted on a horizontal base. It is possible that the lower tie member of the closed frame may be an integral part of the horizontal base. Moreover, at least the upper portion of the closed frame may be additionally supported from below. This can be effected by substantially vertical webs, sheets, columns or the like which support the closed frame at its ends adjacent to the side pieces.

According to a further preferred feature of the invention, the mould parts may in known manner be supported on a track by means of wheels, rollers or the like. The mould parts may be movable on the base and/or on components mounted on the base. In this way one achieves an arrangement in which a substantial part of the weight of the mould parts and of the plates carrying them is taken directly by the base, without the closed frame being loaded. Clearly, the wheels or rollers may alternatively be movable on the ground or on some other equivalent surface which is provided instead of the aforementioned base. On the other hand, there is also the possibility that the mould parts, the plates carrying them, and other associated components may be carried exclusively by the cylinder/piston units which effect opening and closing of the mould parts, with the result that then the weight of the mould parts would be taken up by the side pieces and consequently by the closed frame.

It is also advantageous if the arrangement is so designed that the resulting force which comprises the sealing force and the force resulting from the blowing pressure and which acts on the side pieces acts approximately in the centre of each side piece in order in this way to achieve a uniform distribution of the bending moments.

It is well known that a removal device for the finished articles can be associated with apparatus for producing hollow articles of thermoplastics material by a blowing process. According to a further preferred feature of the invention a removal device for finished articles is positioned at the side of the apparatus adjacent to the lower tie member.

It may also be desirable to arrange that the closed frame, possibly with the horizontal base, is arranged to be displaceable relative to an extruder for the plastics material in order to be able to free the region above the mould parts from the extruder and its associated injection head.

BRIEF DESCRIPTION OF THE DRAWINGS

In order that the invention may be more readily understood, a number of embodiments of apparatus in accordance with the invention will now be described in detail by way of example and with reference to the accompanying drawings, in which:

FIGS. 3 to 6 are plan views which show alternative ways of arranging the closed frame relative to the extruder and to auxiliary devices.

DESCRIPTION OF THE PREFERRED EMBODIMENT

Figure 1:
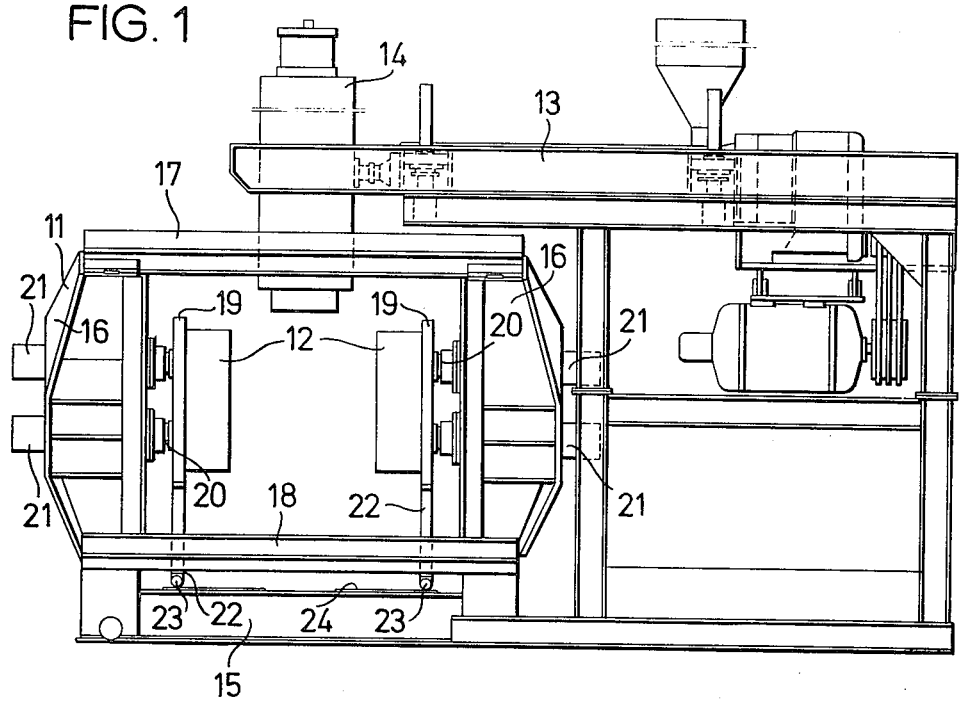
FIG. 1 is a side view of apparatus for producing hollow articles of thermoplastics material by a blowing process.
Figure 2:
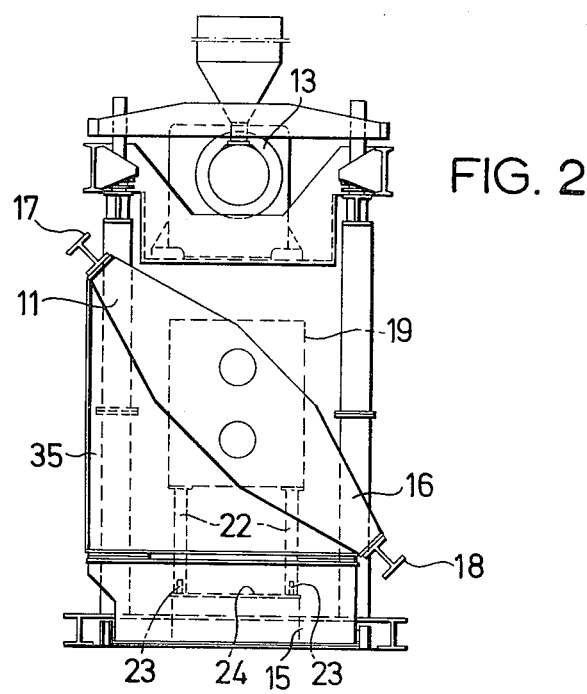
FIG. 2 is a front view of the apparatus of FIG. 1.

The embodiment shown in FIGS. 1 and 2 essentially comprises a closed frame 11 on which are mounted two mould halves 12 of a two-part hollow mould, an extruder 13 with an injection head 14, and a horizontal base 15 which carries the closed frame 11. The closed frame 11 comprises two lateral crossties 16 which are connected together by an upper tie-bar 17 and a lower tie-bar 18.

As can be seen particularly clearly from FIG. 2, the two lateral crossties 16 of the frame are inclined at an angle of about 45° to the horizontal base 15. Consequently, the two tie-bars 17 and 18 lie in respective vertical planes which are spaced from one another by a distance which is approximately equal to the width of the whole apparatus.

The production of a hollow article is carried out in the usual way. Firstly, a preform blank in the form of a section of tube or one or more sheets of material is injected by the head 14 to the region between the two mould halves 12, which at this point in time are open, and which thus occupy the positions shown in FIGS. 1 and 3 to 6. Thereafter, the mould is closed. This closing action is carried out by the two mould halves 12 being moved relative to one another until they abut one another. They then form a nested mould which is not shown in the drawings but which corresponds in shape internally to the hollow article to be produced. After the closure of the mould, or possibly immediately before the mould is quite closed, a pressurized medium, preferably compressed air, is fed into the preform blank so that the blank is expanded into contact with the walls of the mould to take up the shape thereof. The means for supplying the pressurized medium is not shown in the drawing as it is quite conventional.

After the thermoplastics material forming the hollow article has become sufficiently rigid the mould is opened into the position shown in FIGS. 1 and 3 to 6 by a separating movement of the two mould halves 12. The final product can then be removed from the hollow mould or from the region between the two mould halves 12.

The mould halves 12 are carried by plate-like supports 19 which are acted upon by piston rods 20 of hydraulic cylinder/piston units 21. The latter are carried on the substantially diagonally orientated side crossties 16 of the frame 11.

The two plate-like supports 19 for the mould halves 12 are provided on their undersides with extension pieces 22 which are fitted with rollers 23 which run on a track 24 which is fitted in or on the base 15. This track 24 receives practically the whole weight of the mould parts 12 and of the plate-like supports 19, so that the cylinders 21 and the pistons mounted therein are relieved considerably from the weight of the mould parts and of the plates carrying them and of the other associated components.

With the arrangement described above the forces resulting from the blowing pressure are taken up exclusively by the frame 11. It will therefore be appreciated that the two tie-bars 17 and 18 are essentially subjected to tension forces and the two lateral crossties 16 are subjected predominantly to bending forces.

The latter is taken into consideration in the shaping of the lateral crossties 16, which in their central region, approximately where the piston rods of the cylinders 21 act, have a portion of maximum cross-section which reduces towards the ends of the crossties.

The lateral crossties 16, and consequently the whole frame 11, are supported by web-like sheets 35 which are fitted in the region of each crosstie and which essentially take up only the weight, or more accurately a part of the weight, of the frame 11. The stresses created by the mould clamping force and by the blowing pressure are taken up by the frame 11. It is clearly alternatively possible to use column-type supports or the like instead of the web-like sheets 35.

As can be seen particularly clearly from FIG. 2, the upper tie-bar 17 is offset by a distance to the left relative to the parallel vertical plane of symmetry through the apparatus such that the region above the mould is left free, if one disregards the extruder 13 and the associated injection head 14.

As regards the lower tie-bar 18 this is located practically outside the zone of the hollow mould and the associated components, so that the space beneath the mould parts 12 is left unencumbered for the fitting or for the arrangement of any other auxiliary components.

On the other hand, it is possible to integrate the lower tie-bar 18 with the base 15 so that in practice they form just one component.

In FIGS. 3 to 6 the upper tie-bar 17 is shown in darker outline than the lower tie-bar 18 to facilitate the understanding of the following description.

In the embodiment shown in FIG. 3 the frame 11 is arranged transversely to the extruder 13, with the upper tie-bar 17 positioned on the side of the hollow mould adjacent to the extruder 13. It can also be seen from the drawing that it is possible without difficulty to remove the finished moulded article from the apparatus in the direction of the arrow 30. Correspondingly, a receiving device can be positioned in front of the frame 11 at the side of the frame 11 remote from the extruder 13. There is also the possibility of moving the frame 11 laterally relative to the extruder 13 in the direction of the arrows 31 and 32. For this purpose short rails 33 can be provided on which the whole apparatus can run.

In the embodiment shown in FIG. 4 the frame 11 is likewise arranged transversely to and in front of the extruder 13, but in this case the upper tie-bar 17 is positioned at the front. In this case the moulded article will be removed in the direction of the arrow 130 beneath the extruder 13. The same possibilities of lateral movement of the apparatus on the rails 33 arise as mentioned above in relation to FIG. 3.

In the embodiment shown in FIG. 5 the two tie-bars 17 and 18 lie parallel to the extruder 13. In consequence, the frame 11 is arranged to be displaceable relative to the extruder 13 in the direction of the arrow 131. The moulded article is arranged to be removed preferably in the direction of the arrow 230.

The embodiment shown in FIG. 6 corresponds substantially to that shown in FIG. 5, but the upper tie-bar 17 here lies to the right of the extruder 13. Consequently, the removal of the moulded article is preferably effected in the direction of the arrow 231, while the displaceability of the frame 11 relative to the extruder 13 is possible in the direction of the arrow 131 in exactly the same way as in FIG. 5.

The displaceability of the frame 11 in the direction of the arrows 31, 32 or 131 means that it is possible, for example for the replacement of the mould, to remove the frame 11 from the region of the injection head 14 and the extruder 13. From this it follows that the amount of displacement need only be small, for example about 1 to 30 meters. In the embodiments shown in FIGS. 4 to 6 it may be preferable for the frame 11 to be arranged also to be displaceable on rails 133 transversely to the vertical plane in which the opening and closing movement of the mould takes place. This can be advantageous if the displacement of the frame is either wholly or partially for the purpose of making the injection head 14 accessible from below. For this, it is normally necessary to displace the frame by a greater distance than is the case if the frame or the hollow mould is only to be made accessible from above. The amount of the displacement normally plays no decisive role. Whether for example the rails 33 on which the frame 11 is movable are somewhat shorter or longer is unimportant. However, it should be appreciated that the components associated with the frame, e.g. the hollow mould and its driving means and the like, are linked by connections with other parts of the apparatus which do not take part in the displacement movement. It is then necessary to free or to break these connections, for example the conduits for the supply and removal of cooling means for the hollow mould, the pipes for the hydraulic fluid and the like, if the displacement exceeds a predetermined amount. With a displacement transversely to the longitudinal axis of the frame, as for example along the rails 133 shown in chaindotted lines in FIGS. 4 to 6, a relatively short displacement path is in general sufficient in order to make the injection head 14 accessible from below.

We claim:

1. Apparatus for the production of hollow articles of thermoplastics material by a blowing process, comprising a hollow mould in which a preform blank is arranged to be expanded by the application of blowing pressure, the mould being formed in at least two parts with the mould parts each comprising a supporting carrier body being movable relative to one another, means for effecting relative horizontal movement of the mould parts, and means positioned outside the path of movement of said mould parts and supporting carrier body for taking up the forces resulting from the blowing pressure, comprising a closed frame having stationary side pieces on which the mould parts are supported for movement and which comprises upper and lower tie members extending between said side pieces, the upper and lower tie members being arranged to lie in respective vertical planes which are spaced from one another, and the side pieces being oriented at an acute angle relative to the horizontal thereby providing access to the vicinity of the mould parts.

2. Apparatus as claimed in claim 1, in which the side pieces make an angle of between 30° and 60° with the horizontal.

3. Apparatus as claimed in claim 2, in which the side pieces make an angle of substantially 45° with the horizontal.

4. Apparatus as claimed in claim 1, in which the closed frame for the mould parts is mounted on a horizontal base.

5. Apparatus as claimed in claim 4, in which the lower tie member of the closed frame is a part of the horizontal base.

6. Apparatus as claimed in claim 1 which includes additional support means supporting at least the upper portion of the closed frame from below.

7. Apparatus as claimed in claim 6, in which said additional support means comprises substantially vertical support members adjacent to each said side piece to support the closed frame at each end.

8. Apparatus as claimed in claim 4, which further includes a horizontal track disposed below the mould parts fitted on said horizontal base to extend between said two mould parts and a member including roller means supporting the mould parts for movement on said track.

9. Apparatus as claimed in claim 4, in which the mould parts are movable on the base and/or on components mounted on the base.

10. Apparatus as claimed in claim 1, including a removal device for removing the moulded articles normally to the tie bars from either side positioned at the side of the apparatus adjacent to the lower tie member.

11. Apparatus as claimed in claim 1, which includes an extruder for plastics material, and an injection head arranged to deliver the preform blanks to the mould, in which the closed frame is displaceable relative to the extruder.

* * * * *